(12) United States Patent
Tobias et al.

(10) Patent No.: US 11,587,380 B1
(45) Date of Patent: Feb. 21, 2023

(54) SYSTEM FOR TRANSMITTING AN AUTHORIZATION CODE IN A SECURITY APPLICATION

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

( * ) Notice: Subject to any disclaimer, the term of this patent is extended or adjusted under 35 U.S.C. 154(b) by 0 days.

(21) Appl. No.: 17/942,673

(22) Filed: Sep. 12, 2022

Related U.S. Application Data

(60) Provisional application No. 63/388,395, filed on Jul. 12, 2022.

(51) Int. Cl.
*G07C 9/00* (2020.01)

(52) U.S. Cl.
CPC ..... *G07C 9/00182* (2013.01); *G07C 9/00174* (2013.01)

(58) Field of Classification Search
CPC . G07C 9/00182; G07C 9/00174; G08B 13/08
USPC ......................................................... 340/5.64
See application file for complete search history.

(56) References Cited

U.S. PATENT DOCUMENTS

| | | | |
|---|---|---|---|
| 5,332,992 A | 7/1994 | Woods | |
| 5,534,849 A * | 7/1996 | McDonald | G08B 13/08 340/517 |
| 5,541,585 A * | 7/1996 | Duhame | G07C 9/28 235/382 |
| 5,673,021 A * | 9/1997 | Woods | G08B 13/08 335/207 |
| 6,506,987 B1 | 1/2003 | Woods | |
| 6,603,378 B1 | 8/2003 | Collins | |
| 7,023,308 B2 | 4/2006 | Woods | |
| 7,291,794 B2 | 11/2007 | Woods | |
| 7,944,334 B2 | 5/2011 | Woods | |
| 7,973,659 B2 * | 7/2011 | Sharma | G08B 25/14 340/545.7 |
| 8,074,479 B2 | 12/2011 | Harley | |
| 8,648,720 B2 | 2/2014 | Woods | |
| 9,057,210 B2 * | 6/2015 | Dumas | G07C 9/00309 |
| 9,136,070 B2 | 9/2015 | Oetjen | |
| 9,569,942 B2 * | 2/2017 | Richter | G08B 13/149 |
| 9,640,004 B2 * | 5/2017 | Lowder | G07C 9/00309 |
| 9,685,289 B1 | 6/2017 | Woods | |
| 9,685,290 B1 | 6/2017 | Hedeen | |
| 9,704,680 B1 | 7/2017 | Hedeen | |
| 9,790,736 B2 * | 10/2017 | Kincaid | E06B 7/28 |
| 9,934,921 B2 | 4/2018 | Hedeen | |

(Continued)

*Primary Examiner* — Nam V Nguyen
(74) *Attorney, Agent, or Firm* — Jeffrey A. Proehl; Woods, Fuller, Shultz & Smith, PC

(57) ABSTRACT

A system may include a first security component configured to emanate a signal with an authorizing code, and may have a magnetic field generating device configured to generate a signaling magnetic field including the signal with the authoring code. The system may also include a second security component configured to wirelessly receive the signal with the authorizing code when the second security component is proximate to the signaling magnetic field of the first security component. The second security component may include a magnetic field sensor configured to sense the signal emanating from the magnetic field generating device, and the sensor may be changed between first and second states by a change in the signaling magnetic field.

19 Claims, 3 Drawing Sheets

(56) References Cited

U.S. PATENT DOCUMENTS

| | | | |
|---|---|---|---|
| 10,423,136 B2 * | 9/2019 | Davis | G07C 9/00309 |
| 10,541,095 B2 * | 1/2020 | Woods | G08B 13/08 |
| 10,997,806 B2 * | 5/2021 | Earles | G07C 9/20 |
| 11,069,496 B2 | 7/2021 | Hedeen | |
| 11,401,733 B2 * | 8/2022 | Brown | H04B 1/06 |
| 11,414,887 B2 * | 8/2022 | Piirainen | H01F 7/1615 |
| 2013/0241694 A1 * | 9/2013 | Sharma | H01Q 1/2208 |
| | | | 340/5.64 |
| 2021/0396046 A1 * | 12/2021 | Johnson | E05B 63/0065 |

* cited by examiner

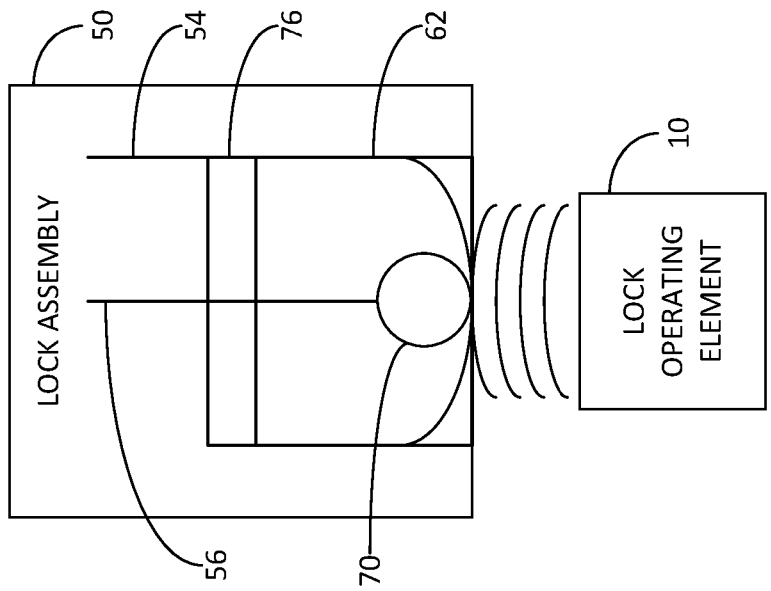
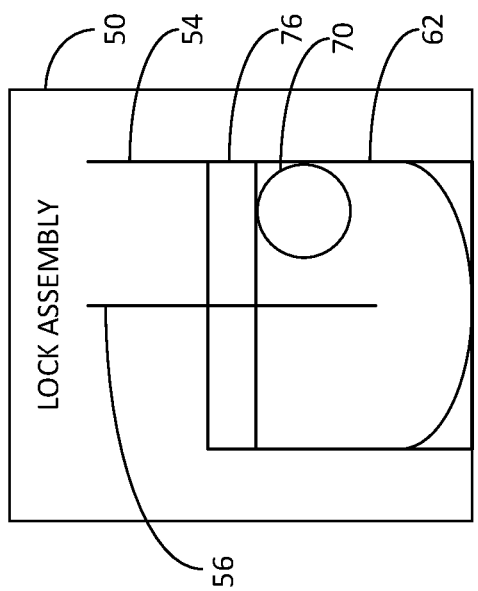
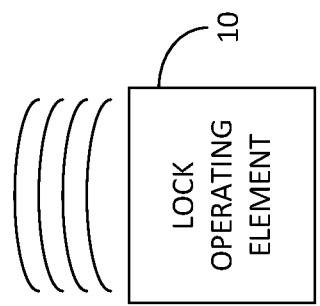
FIG. 4A
FIG. 4B

SYSTEM FOR TRANSMITTING AN AUTHORIZATION CODE IN A SECURITY APPLICATION

REFERENCE TO RELATED APPLICATIONS

This application claims the priority benefit of U.S. Provisional Patent Application No. 63/388,395, filed Jul. 12, 2022, which is hereby incorporated by reference in its entirety.

BACKGROUND

Field

The present disclosure relates to security systems and more particularly pertains to a new system for transmitting an authorization code in A security application, such as the illustrative use in a security system to enhance the secure operation of a lock assembly.

SUMMARY

In one aspect, the present disclosure relates to a system which may comprise a first security component configured to emanate a signal with an authorizing code, and the first security component may comprise a magnetic field generating device configured to generate a signaling magnetic field including the signal with the authorizing code. The system may also include a second security component configured to wirelessly receive the signal with the authorizing code when the second security component is proximate to the signaling magnetic field of the first security component. The second security component may comprise a magnetic field sensor configured to sense the signal emanating from the magnetic field generating device. The magnetic field sensor may have a first state and a second state, and the magnetic field sensor may be changed from one said state to the other said state by a change in the signaling magnetic field. The second security component may further comprise a processor in communication with the magnetic field sensor to receive a representation of the signal emanating from the magnetic field generating device to derive a received code from the first component, and the processor may be configured to compare the received code to at least one authorizing code.

In another aspect, the disclosure relates to a system which may comprise a lock operating object for operating a lock assembly, and the lock operating object may comprise a magnetic field generating device configured to emanate a signal from the lock operating object. The signal may include a unique authorizing code associated with the lock operating object, and the magnetic field device may being configured to generate a signaling magnetic field. The system may also comprise a lock assembly configured to provide a releasable securement of elements with respect to each other. The lock assembly may include a magnetic field sensor configured to sense the signal emanating from the magnetic field generating device of the lock operating object. The magnetic field sensor may have a first state and a second state, and the magnetic field sensor may be changed from one said state to the other said state by a change in the signaling magnetic field. The lock assembly may also include a lock processor in communication with the magnetic field sensor to receive a representation of the signal emanating from the magnetic field generating device of the lock operating object to derive a received code from the lock operating object. The lock processor may be configured to compare the received code from the lock operating object to the at least one authorizing code authorized to operate the lock assembly. The lock assembly may further include an actuating mechanism having a locked condition and an unlocked condition, and the actuating mechanism may be in communication with the lock processor such that the lock processor is configured to change the condition of the actuating mechanism to move a lock element between a locked position and an unlocked position.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 4A is a schematic diagram of the magnetic field sensor of the lock assembly and the lock operating object of the system at a distance, according to an illustrative embodiment.

FIG. 4B is a schematic diagram of the magnetic field sensor of the lock assembly and the lock operating object of the system at close proximity, according to an illustrative embodiment.

DETAILED DESCRIPTION

Figure 1:
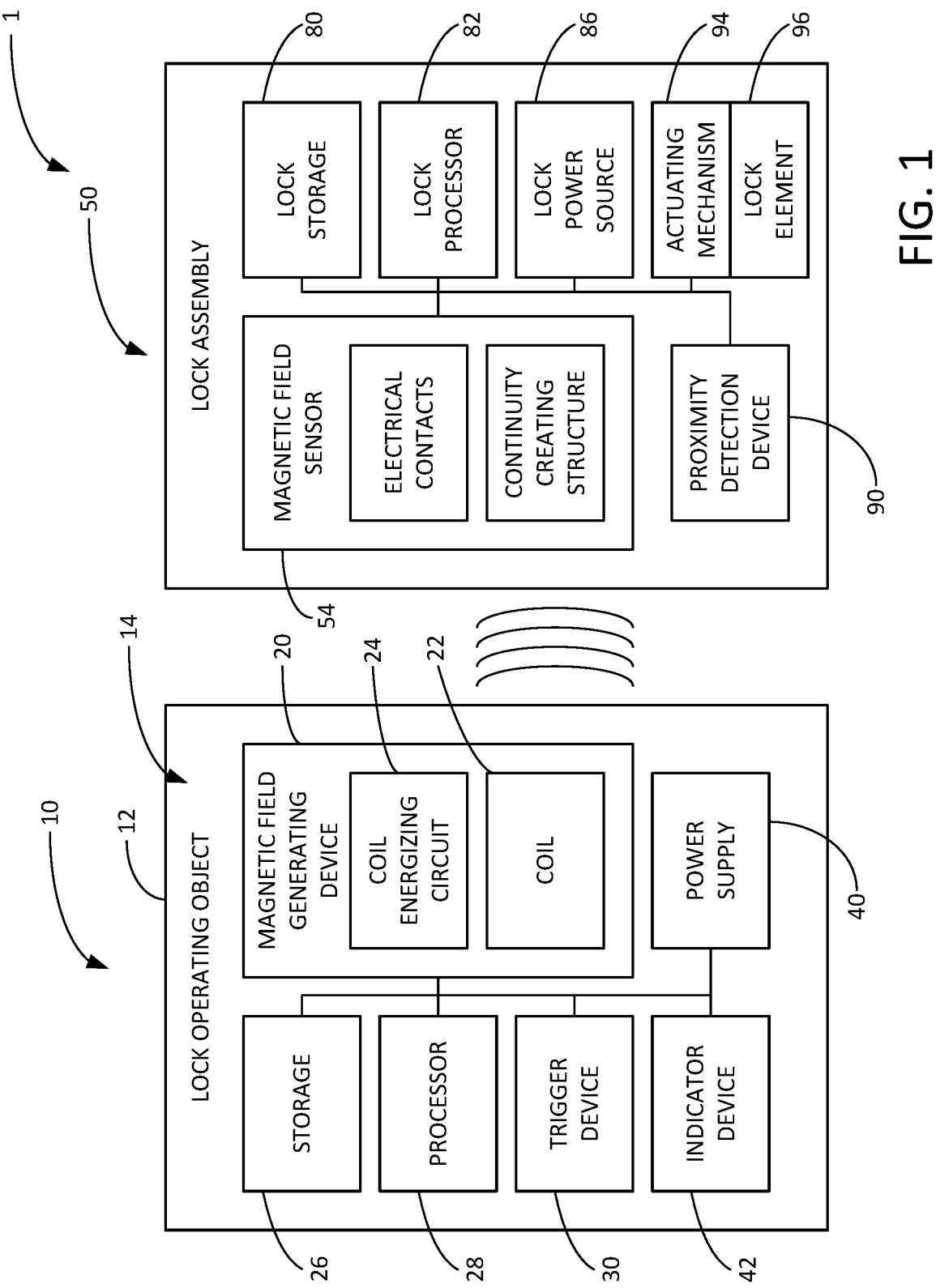
FIG. 1 is a schematic diagram of a new system for transmitting an authorization code from a lock operating object to a lock assembly according to the present disclosure.
Figure 3:
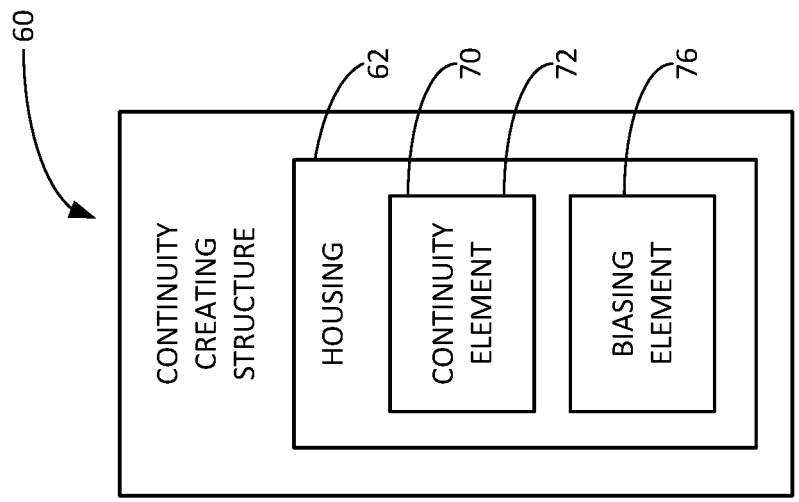
FIG. 3 is a schematic diagram of the continuity creating structure of the lock assembly of the system, according to an illustrative embodiment.
Figure 2A:
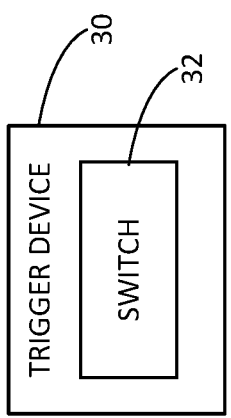
FIG. 2A is a schematic diagram of an illustrative embodiment of a trigger device of the lock operating object of the system, according to an illustrative embodiment.
Figure 2B:
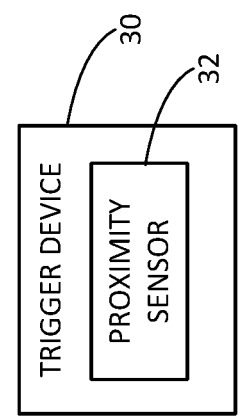
FIG. 2B is a schematic diagram of another illustrative embodiment of a trigger device of the lock operating object of the system, according to an illustrative embodiment.

With reference now to the drawings, and in particular to FIGS. 1 through 4 thereof, a new system for transmitting authorization code from lock operating object to lock assembly embodying the principles and concepts of the disclosed subject matter will be described.

The applicant has recognized the advantages of lock systems which provide the enhanced security of utilization of an electronic authorization code to control operation of a lock assembly by an authorization object. Moreover, the applicant has also recognized the advantages of wireless transmission of an authorization code from the authorization object to the lock assembly, particularly when such a system can be implemented in a manner that avoids much of the complexity (and consequent expense) utilized to transmit codes in known lock systems. Further advantage may be gained by providing a system in which authorization codes may be transmitted using a relatively low power magnetic field that makes the authorization code transmission difficult to intercept for unauthorized replication. Additional advantage can be gained from a system with these advantages that can be implemented in locations where conventional lock systems are utilized, such as doors, safes, and other structures where access control is desirable.

The applicant has thus developed a system with aspects which provide various advantages, including the advantages outlined above as well as advantages that will become evident from the following description of the disclosure. In some aspects, the disclosure relates to a system 1 which may broadly include a first security component and a second security component in which the components are configured so that a unique authorizing code, or in some implementations a limited number of authorizing codes, may be communicated from the first security component to the second security component in a manner that is significantly less vulnerable to compromise or interference with the functionality of the transfer of the code or codes between the components. In illustrative embodiments, the first security component may comprise a lock assembly 50 configured to provide a releasable securement of elements with respect to each other, and the second security component may comprise a lock operating object 10 for operating aspects of the lock assembly. In some aspects, the disclosure relates to various combinations of elements of a lock operating object and a lock assembly of systems which embody and implement the operational aspects, separate of other elements of the lock operating object and the lock assembly not utilized to implement the operational aspect.

In greater detail, the lock operating object 10 may comprise a case 12 on which elements of the lock operating object are mounted, and the case may define a case interior 14 in which elements of the lock operating device are positioned. Significantly, elements or components for implementing operational aspects of the disclosure on the lock operating object 10 may include a magnetic field generating device 20 which is configured to emanate a signal from the lock operating object. Illustratively, the signal emanating from the device 20 may include a unique authorizing code uniquely associated with the lock operating object for identifying the object. The number of bit positions utilized in the authorizing code may provide a suitable number of unique authorization codes, and consequently increasing the number of bit positions in the code increases the number of unique authorization code values. In some illustrative implementations, and authorizing code regimen with sufficient bit positions to provide approximately 1 million unique authorizing codes may be utilized. Additional transmission components may also be utilized, such as a "handshake" component which functions to, for example, synchronize the timing of the transmission of the bit positions of the authorizing code between transmission elements of the lock operating object 10 and the receiving elements of the lock assembly 50.

The magnetic field generating device 30 may be configured to generate a signaling magnetic field, and the signal may include fluctuations or oscillations or variations in the magnetic field, such as the magnitude of the field strength of the magnetic field, that is generated by the magnetic field generating device. The oscillations may encode the unique authorizing code for communicating the code wirelessly to other objects. Illustratively, the oscillations may produce a stream of pulses in the magnetic field which contain information such as the authorizing code. The magnetic field generating device 20 may be mounted on the case 12, and may be located in the case interior 14.

Embodiments of the magnetic field generating device 20 may include a coil 22 which is configured to carry an electrical current, and which may generate the signaling magnetic field signal when carrying the current. The field generating device 20 may further include a coil energizing circuit 24 that energizes the coil 22 to produce the signal magnetic field, and the energizing circuit 24 may be configured to energize the coil 22 in a manner indicative of the unique authorizing code. The coil energizing circuit 24 may be configured to selectively energize and de-energize the coil to indicate the code, such as in a binary (e.g., on and off, high and low. etc.) form. Illustratively, the coil and the coil generating circuit may be located in the case interior 14

The lock operating object 10 may further include storage 26 configured to store data such as the unique authorizing code associated with the lock operating object 10. The lock operating object 10 may also include a processor 28 in communication with the magnetic field generating device. The processor 28 may be configured to cause the magnetic field generating device 24 to emanate the signal, and the processor 28 may be in communication with the storage 26 to communicate or transfer the unique authorizing code to the magnetic field generating device. The processor 28 may effectively be in communication with the coil energizing circuit of the magnetic field generating device to cause a series of fluctuations or pulses in the signal to be transmitted in the magnetic field via the generating device.

The lock operating object 10 may also comprise a trigger device 30 for causing the magnetic field generating device 24 to emanate the signal. The trigger device 30 may be influenced by a condition that is external to the lock operating object to cause the emanation of the signal by the generating device 24. Illustratively, the trigger device 30 may be in communication with the processor 28 to have the processor cause the magnetic field generating device to emanate the signal. In some embodiments, the trigger device 30 may include an actuating switch 32, and the actuating switch may be physically-actuated, such as by the depression of a button of the actuating switch. In some embodiments, the trigger device 30 may include a proximity sensor 36 which is configured to sense the proximity of the lock operating object 10 to another object, such as the lock assembly 50 which would correspond to a circumstance under which the signal is most useful for being emanated.

The lock operating object 10 may also have a power supply 40 for suppling power to elements of the object 40. The power supply 40 may comprise an electrical power source, such as a battery, and the battery may be rechargeable. An indicator device 42 may be provided on the operating device for indicating a status condition. Illustratively, the status condition may comprise the emanation of the signal by the magnetic field generating device.

Embodiments of the disclosure may include elements or components for implementing the operational aspects of the system on the lock assembly 50, and the embodiments may or may not include the lock assembly 50 itself. The elements of the system 1 may include a magnetic field sensor 52 which is configured to sense the signal emanating from the magnetic field generating device 20 that may be incorporated with the lock operating object. The magnetic field sensor 52 may have a first state and a second state. In some implementations, the first state may provide electrical continuity between a pair of electrical contacts 54, 56 and the second state exhibiting electrical discontinuity between the electrical contacts. The magnetic field sensor 52 may be biased toward one of the states, and illustratively the magnetic field sensor 52 may be biased toward the first state. Optionally, the sensor 52 may be biased toward the second state.

Significantly, the magnetic field sensor may be changed from one of the states to the other one of the states by fluctuations or oscillations in the magnitude of the field strength of the magnetic field generating device 20 of the lock operating object.

In greater detail, the magnetic field sensor 52 may comprise the pair of electrical contacts 54, 56, and a continuity creating structure 60 configured to create and remove electrical continuity between the electrical contacts. The continuity creating structure 60 may comprise a housing 62 which may define an interior chamber 64 and have an exterior 66. The pair of contacts 54, 56 may be mounted on the housing 62, and at least a portion of each of the electrical contacts may be exposed on the exterior 66 of the housing. In some embodiments, the housing 62 may be in electrical continuity with the first electrical contact 54 and the housing 62 may be electrically isolated from the second electrical contact 56.

The magnetic field sensor 52 may further include a continuity element 70 which may be configured to alternately provide and remove continuity between the first 54 and second 56 electrical contacts. The continuity element 70 may be positioned in the interior chamber 64 of the housing, and may be movable in the chamber 64 between one or more continuity positions and one or more discontinuity positions. In the illustrative embodiments, the one or more continuity positions of the continuity element 70 may correspond to the first state of the magnetic field sensor 52, and the one or more discontinuity positions may correspond to the second state of the magnetic field sensor.

The continuity element 70 may be magnetically receptive such that the object is influenced by a magnetic field, and may be biased to move toward a source of a magnetic field. Illustratively, the continuity element 70 may be formed of a ferrous material. Thus, the continuity element 70 may be biased to move toward the magnetic field generating device. The continuity element 70 may be electrically conductive such that the element is able to conduct electricity, and an outer surface 72 of the continuity element may be electrically conductive and formed of an electrically conductive material. Illustratively, the outer surface 72 may have a spherical shape.

The magnetic field sensor 52 may also comprise a biasing element 76 for biasing the continuity element 70 toward the one or more positions that correspond to one of the states of the field sensor 52. The biasing element 76 may further bias the continuity element 76 away from the one or more positions corresponding to another one of the states of the magnetic field sensor. For example, in embodiments, the biasing element 76 is positioned on the housing 62 to urge the continuity element 70 toward the continuity positions. In such embodiments, the biasing element 76 may be positioned on the housing 62 to urge the continuity element away from the discontinuity positions. As a further example, in further embodiments, the biasing element 76 is positioned on the housing 62 to urge the continuity element 70 toward the discontinuity positions. In such embodiments, the biasing element 76 may be positioned on the housing 62 to urge the continuity element away from the continuity positions.

The biasing element 76 may be configured to produce a magnetic field to cause the biasing of the continuity element into one of the states, and may be formed of a magnetic material. Advantageously, the influence of the signaling magnetic field of the magnetic field generating device 20 is able to overcome the influence of the magnetic field of the biasing element 76 on the continuity element 70, when the lock operating object 10 is sufficiently proximate to the lock assembly 50.

Some highly suitable devices for providing the functionality of the magnetic field sensor 52 is disclosed in, for example, U.S. Pat. No. 7,023,308 of Randall Woods, which is hereby incorporated by reference in its entirety. Suitable devices for performing the function of the magnetic field sensor may be commercially available from Magnasphere Corporation of Waukesha, Wis.

A lock storage 80 configured to store at least one authorizing code may be provided for indicating a code authorized to operate the lock assembly, or one or more "authorized" authorizing code or codes, and may be incorporated with the lock assembly 50. Optionally a plurality of authorizing codes authorized to operate the assembly 50 may be stored. A lock processor 82 may be in communication with the magnetic field sensor 52 to receive a representation of the signal emanating from the magnetic field generating device 20 of the lock operating object to derive a received code from the lock operating object 10. The lock processor 82 may also be associated with the lock assembly 50. The lock processor 82 may also be in communication with the lock storage 80 to access one or more of the authorizing code stored in the storage 80. The lock processor 82 may be configured to compare the received code (or code received from the lock operating object 10) to the one or more authorizing codes corresponding to one or more objects authorized to operate the lock assembly 50.

A lock power source 86 may be configured to provide electrical power to elements such as the magnetic field sensor 52, the lock storage 80, and the lock processor 82, as well as other elements of the lock assembly 50. Optionally, the lock power source 86 may be a battery which is rechargeable, and/or or may be replaceable. A proximity detection device 90 may be provided, such as a component of the lock assembly 50, for detecting movement of the lock operating object 10 into proximity of the lock assembly 50 embodying the system. The proximity detection device 90 may be configured initiate sensing by the magnetic field sensor 52 of the lock assembly, and may be triggered by a magnetic field 92 of the magnetic field generating device 20 being proximate to the detection device 90. The proximity detection device 90 may permit power from the lock power source 86 to energize the elements of the lock assembly 50 when the detection device 90 is triggered, which may permit the power consumption of the lock assembly to be minimized during periods of time when no lock operating object 10.

The lock assembly 50 may have a locked condition and an unlocked condition, with the locked condition corresponding to the lock assembly being in a configuration producing the securing of an object, such as the latch or bolt of a door latch assembly, and the unlocked condition corresponding to the lock assembly being in a configuration producing the un-securing, or release, of the object, such as the latch or bolt of a door latch assembly. An actuating mechanism 94 of the lock assembly may be configured to move a lock element 96 of the lock assembly between a locked position and an unlocked position. The locked position of the lock element 96 may correspond to the locked condition of the lock assembly 50, and the unlocked position may correspond to the unlocked condition of the assembly 50. Illustratively, the lock element 96 may comprise a latch bolt or a deadbolt, and may include structure that moves the latch bolt or dead bolt between the locked in the unlocked positions, such as by mechanical or electromechanical means.

The actuating mechanism 94 may be in communication with the lock processor 82 and be responsive to a command or signal from the processor 82 to change the condition of the mechanism 94, and the position of the lock element 96, between the locked condition (e.g., locked position) and/or the unlocked condition (e.g., unlocked position). Provision of the command from the lock processor may be based upon the receipt of the processor 82 of an authorizing code that has been compared to authorized codes stored in the lock storage and has been determined to match one of the authorized codes for lock assembly operation, e.g., for changing the lock assembly from the locked condition to the unlocked condition, or from the unlocked condition to the locked condition.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
    a first security component configured to emanate a signal with an authorizing code, the first security component comprising:
        a magnetic field generating device configured to generate a signaling magnetic field including the signal with the authorizing code;
    a second security component configured to wirelessly receive the signal with the authorizing code when the second security component is proximate to the signaling magnetic field of the first security component, the second security component comprising:
        a magnetic field sensor configured to sense the signal emanating from the magnetic field generating device, the magnetic field sensor having a first state and a second state, the magnetic field sensor being changed from one said state to the other said state by a change in the signaling magnetic field;
        a processor in communication with the magnetic field sensor to receive a representation of the signal emanating from the magnetic field generating device to derive a received code from the first component, the processor being configured to compare the received code to at least one authorizing code;
    wherein the magnetic field sensor comprises:
        a pair of electrical contacts including first and second electrical contacts; and
    a continuity creating structure configured to create and remove electrical continuity between the electrical contacts based upon a change in the signaling magnetic field; and
        wherein the continuity creating structure includes a continuity element configured to alternately create and remove continuity between the first and second electrical contacts, the continuity element being movable between one or more continuity positions and one or more discontinuity positions, the one or more continuity positions of the continuity element corresponding to the first state of the magnetic field sensor, the one or more discontinuity positions corresponding to the second state of the magnetic field sensor.

2. The system of claim 1 wherein the first security component comprises a lock operating object for operating a lock assembly and the second security component comprises a lock assembly configured to provide a releasable securement of elements with respect to each other.

3. The system of claim 2 wherein the lock assembly of the second security component further comprises an actuating mechanism having a locked condition and an unlocked condition, the actuating mechanism being in communication with the processor such that the processor is configured to change the condition of the actuating mechanism to move a lock element between a locked position and an unlocked position.

4. The system of claim 2 wherein the magnetic field sensor is changed from one said state to the other said state by the oscillations in the magnitude of the field strength of the magnetic field generating device.

5. The system of claim 1 wherein the signal emanating from the magnetic field generating device includes oscillations in a magnitude of a field strength of the magnetic field generated by the magnetic field generating device, the oscillations encoding the authorizing code.

6. The system of claim 1 wherein the magnetic field generating device includes:
   a coil configured to carry an electrical current; and
   a coil energizing circuit configured to energize the coil to produce the signal, the coil energizing circuit being configured to selectively energize and de-energize the coil to indicate the authorizing code.

7. The system of claim 1 wherein first security component includes a trigger device for causing the magnetic field generating device to emanate the signal, the trigger device being influenced by a condition external to the first security component to cause the emanation of the signal.

8. The system of claim 1 wherein the first state of the magnetic field sensor provides electrical continuity between electrical contacts and the second state exhibits electrical discontinuity between the electrical contacts.

9. The system of claim 1 wherein the continuity element is magnetically receptive such that the continuity element is influenced by the signaling magnetic field.

10. The system of claim 9 wherein the continuity element is magnetically urged to move toward a source of the signaling magnetic field.

11. The system of claim 9 wherein the continuity element is electrically conductive such that the element is able to conduct electricity.

12. The system of claim 1 wherein the continuity creating structure includes a biasing element biasing the continuity element toward the one or more positions corresponding to one of the states of the magnetic field sensor.

13. The system of claim 12 wherein the biasing element biases the continuity element away from one or more positions corresponding to another one of the states of the magnetic field sensor.

14. The system of claim 12 wherein the biasing element produces a magnetic field, the influence of the signaling magnetic field of the magnetic field generating device on the continuity element being able to overcome the influence of the magnetic field of the biasing element on the continuity element.

15. A system comprising:
   a lock operating object for operating a lock assembly, the lock operating object comprising:
      a magnetic field generating device configured to emanate a signal from the lock operating object, the signal including an authorizing code associated with the lock operating object, the magnetic field generating device being configured to generate a signaling magnetic field;
   a lock assembly configured to provide a releasable securement of elements with respect to each other, the lock assembly comprising:
      a magnetic field sensor configured to sense the signal emanating from the magnetic field generating device of the lock operating object, the magnetic field sensor having a first state and a second state, the magnetic field sensor being changed from one said state to the other said state by a change in the signaling magnetic field;
      a lock processor in communication with the magnetic field sensor to wirelessly receive a representation of the signal emanating from the magnetic field generating device of the lock operating object to derive a received code from the lock operating object, the lock processor being configured to compare the received code from the lock operating object to at least one authorizing code authorized to operate the lock assembly; and
      an actuating mechanism having a locked condition and an unlocked condition, the actuating mechanism being in communication with the lock processor such that the lock processor is configured to change the condition of the actuating mechanism to move a lock element between a locked position and an unlocked position;
   wherein the magnetic field sensor comprises a continuity creating structure configured to create and remove electrical continuity between the electrical contacts based upon a change in the signaling magnetic field; and
   wherein the continuity creating structure includes a continuity element configured to alternately create and remove continuity between the first and second electrical contacts, the continuity element being movable between one or more continuity positions and one or more discontinuity positions, the one or more continuity positions of the continuity element corresponding to the first state of the magnetic field sensor, the one or more discontinuity positions corresponding to the second state of the magnetic field sensor.

16. The system of claim 15 wherein the signal emanating from the magnetic field generating device of the lock operating object includes oscillations in a magnitude of a field strength of the magnetic field generated by the magnetic field generating device, the oscillations encoding the authorizing code.

17. The system of claim 15 wherein the magnetic field sensor of the lock assembly is changed from one said state to the other said state by the oscillations in the magnitude of the field strength of the magnetic field generating device of the lock operating object.

18. The system of claim 15 wherein the first state of the magnetic field sensor provides electrical continuity between electrical contacts of the magnetic field sensor and the second state exhibits electrical discontinuity between the electrical contacts of the magnetic field sensor.

19. The system of claim 15 wherein the continuity element is magnetically receptive such that the continuity element is influenced by the signaling magnetic field and continuity element is magnetically urged to move toward a source of the signaling magnetic field; and
   wherein the continuity element is electrically conductive such that the element is able to conduct electricity.

* * * * *